United States Patent
Oh et al.

(10) Patent No.: US 12,189,017 B2
(45) Date of Patent: Jan. 7, 2025

(54) IN-CABIN RADAR APPARATUS

(71) Applicant: SMART RADAR SYSTEM, INC., Seongnam-si (KR)

(72) Inventors: Kyung Sub Oh, Hwaseong-si (KR); Yong Jae Kim, Yongin-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 236 days.

(21) Appl. No.: 17/585,598

(22) Filed: Jan. 27, 2022

(65) Prior Publication Data

US 2023/0236302 A1   Jul. 27, 2023

(51) Int. Cl.
*G01S 13/04* (2006.01)
*B60W 40/08* (2012.01)

(52) U.S. Cl.
CPC ............ *G01S 13/04* (2013.01); *B60W 40/08* (2013.01); *B60W 2420/408* (2024.01); *B60W 2540/221* (2020.02); *B60W 2540/223* (2020.02); *B60W 2540/229* (2020.02)

(58) Field of Classification Search
CPC ... G01S 13/04; B60W 2420/40; B60W 40/08; B60W 2540/229; B60W 2540/223; B60W 2540/221
USPC ........................................................ 342/27
See application file for complete search history.

(56) References Cited

U.S. PATENT DOCUMENTS

| | | | |
|---|---|---|---|
| 8,624,775 B2 | 1/2014 | Inami et al. | |
| 9,368,881 B2 | 6/2016 | Lee et al. | |
| 10,838,039 B2 | 11/2020 | Cho | |
| 2007/0285336 A1 | 12/2007 | Kamgaing | |
| 2016/0033632 A1* | 2/2016 | Searcy | G01S 13/424 342/153 |
| 2019/0363430 A1* | 11/2019 | Wang | G01S 13/931 |

(Continued)

FOREIGN PATENT DOCUMENTS

| | | |
|---|---|---|
| JP | 2009-540691 A | 11/2009 |
| JP | 5318199 B2 | 10/2013 |

(Continued)

OTHER PUBLICATIONS

Adela, "Antennas for Silicon-Based MM-wave FMCW Radars," Technische Universiteit Eindhoven, ISBN: 978-90-386-4896-5, 2019 (Year: 2019).*

Sangkil Kim et al, 77-GHz mmWave antenna array on liquid crystal polymer for automotive radar and RF front-end module, 2019, 262-269, Wiley ETRI Journal.

(Continued)

*Primary Examiner* — James R Hulka
*Assistant Examiner* — Samarina Makhdoom
(74) *Attorney, Agent, or Firm* — Insight Law Group, PLLC; Seung Lee (57) ABSTRACT

In an in-cabin radar apparatus, transmitting antennas are disposed at one side in a direction parallel to a control circuit and disposed in a line in a vertical direction, and receiving antennas are disposed at one side in a direction perpendicular to the control unit and disposed in a line in a horizontal direction. Each transmission side feed line may be perpendicularly connected to one of the transmitting antennas, and each receiving side feed line may be perpendicularly connected to one of the receiving antennas. Each of a distance between the transmitting antennas and a distance between the receiving antennas may be implemented to be less than or equal to half of a transmitting and receiving wavelength.

11 Claims, 10 Drawing Sheets

(56) References Cited

U.S. PATENT DOCUMENTS

| | | | | |
|---|---|---|---|---|
| 2020/0191904 A1* | 6/2020 | Sakurai | ............... | H01Q 3/22 |
| 2020/0249344 A1* | 8/2020 | Heo | ............... | G01S 13/04 |
| 2020/0333432 A1* | 10/2020 | Kim | ............... | G01S 7/03 |
| 2021/0104818 A1* | 4/2021 | Li | ............... | G01S 7/03 |

FOREIGN PATENT DOCUMENTS

| | | | | |
|---|---|---|---|---|
| JP | 6087419 B2 | 3/2017 | | |
| KR | 10-1226545 B1 | 2/2013 | | |
| KR | 10-2015-0124272 A | 11/2015 | | |
| KR | 10-2018-0092134 A | 8/2018 | | |
| KR | 10-2019-0049198 A | 5/2019 | | |
| KR | 10-2019-0113159 A | 10/2019 | | |
| KR | 10-2020-0095703 A | 8/2020 | | |
| WO | WO-2021149049 A2 * | 7/2021 | ............ | G01S 13/87 |

OTHER PUBLICATIONS

Samat Turdumamatov, Improving Microstrip Patch Antenna Using Electromagnetic Band Gap Structures, Institute of Automation and Information Technologies, National Academy of Science of the Kyrgyz Republic, Bishkek, Kyrgygyzstan, 2017.

Sonia Sharma, C et al., Impedance Matching Techniques for Microstrip Patch Antenna, Indian Journal of Science and Technology, Jul. 2017.

Non-final office action mailed Jan. 24, 2022 from the Korean Intellectual Property Office for Korean Application No. 10-2020-0145858.

Notice of Allowance mailed Jul. 6, 2022 for Korean Application No. 10-2020-0145858.

Non-final office action mailed May 20, 2022 from the Korean Patent Office for Korean Application No. 10-2020-0149083.

\* cited by examiner

IN-CABIN RADAR APPARATUS

BACKGROUND

1. Field

The present invention relates to in-cabin radar apparatus.

2. Description of Related Art

The following description relates to a radar apparatus installed in a vehicle. An in-cabin radar, which is installed in a vehicle, is installed in an inner upper portion of the vehicle and used to check the number of passengers or detect a pose, drowsiness, a pulse, respiration, and the like of a driver.

Since the in-cabin radar is for short range detection, a virtual array pattern may be formed to correspond to a space in the vehicle. In addition, a received beam distribution should be designed to correspond to features of the space in the vehicle. Due to miniaturization of the apparatus, problems easily occur in direct coupling between transmitting and receiving antennas.

According to one aspect of the present invention, in an in-cabin radar apparatus, transmitting antennas are disposed at one side in a direction parallel to a control circuit and disposed in a line in a vertical direction, and receiving antennas are disposed at one side in a direction perpendicular to a control circuit and disposed in a line in a horizontal direction.

According to an additional aspect, each transmission side feed line may be perpendicularly connected to one of the transmitting antennas. In addition, each receiving side feed line may be perpendicularly connected to one of the receiving antennas.

According to an additional aspect, each of a distance between transmitting antennas and a distance between receiving antennas may be implemented to be less than or equal to half of a transmitting and receiving wavelength.

According to an additional aspect, a receiving side feed line may include an impedance matching pattern for impedance matching.

According to an additional aspect, transmission side feed lines and receiving side feed lines may be implemented in coplanar waveguide forms.

According to an additional aspect, an in-cabin radar apparatus may further include a large area electromagnetic band gap (EBG) pattern installed between disposed transmitting antennas and disposed receiving antennas and having a high impedance characteristic in a transmitting and receiving frequency band.

According to an additional aspect, an in-cabin radar apparatus may further include a small area EBG pattern installed at a side opposite to a side at which a large area EBG pattern is installed with respect to a receiving antenna part and having a high impedance characteristic in a transmitting and receiving frequency band.

According to an additional aspect, a plurality of transmitting antennas may be disposed in a vertical direction, and each of the transmitting antennas may include a pair of transmitting antenna patches between which a distance is greater than or equal to 0.6 times and less than 1 times a transmitting and receiving wavelength and which are disposed obliquely. In addition, a plurality of receiving antennas may be disposed in a horizontal direction, and each of the receiving antennas may include a pair of receiving antenna patches between which a distance is greater than or equal to 0.6 times and less than 1 times the transmitting and receiving wavelength and which are disposed obliquely.

DETAILED DESCRIPTION

Hereinafter, in order to facilitate understanding and embodiment by those skilled in the art, the present invention will be described in detail by explaining exemplary embodiments with reference to the accompanying drawings. Although specific embodiments are illustrated in the drawings and detailed explanations are described, the embodiments are not intended to limit embodiments of the present invention in the specific forms. In the description of the invention, when it is determined that detailed descriptions of related well-known functions unnecessarily obscure the gist of the invention, the detailed descriptions thereof will be omitted. It will be understood that when an element is referred to as being "connected" or "coupled" to another element, it can be directly connected or coupled to another element or intervening elements may be present.

Figure 1:
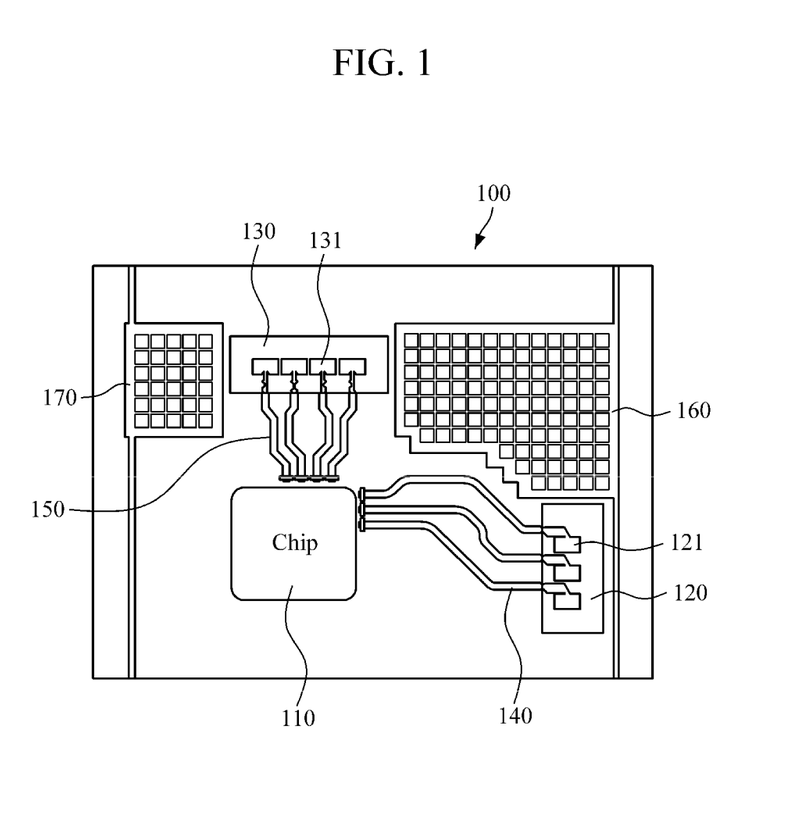
FIG. 1 is a view illustrating a configuration of an in-cabin radar apparatus according to one embodiment.

FIG. 1 is a view illustrating a configuration of an in-cabin radar apparatus according to one embodiment. As illustrated in the drawing, an in-cabin radar apparatus 100 according to one embodiment includes a control circuit 110, a transmitting antenna part 120, and a receiving antenna part 130. The control circuit 110 transmits radar signals through i transmission channels, generates a received beam distribution by processing radar signals which are reflected by an object in a vehicle and received through j receiving channels, and recognizes the object in the vehicle from the generated received beam distribution. In this case, the received beam distribution may be a spatial distribution in which individual virtual detection areas obtained using i*j virtual antennas are merged and a sensitivity distribution is selectively added for each area.

The transmitting antenna part 120 is installed at one side in a direction parallel to the control circuit 110, and i transmitting antennas 121 are disposed in a line in a vertical direction. In this case, a distance between the transmitting antennas 121 may be implemented to be less than a half wavelength of a transmitting and receiving wavelength. When the distance between the transmitting antennas 121 is implemented to be less than the half wavelength of the transmitting and receiving wavelength, since a grating lobe, which is an undesirable radiation lobe, may be removed, performance can be improved.

The receiving antenna part 130 is installed at one side in a direction perpendicular to the control circuit 110, and j receiving antennas 131 are disposed in a line in a horizontal direction. In this case, a distance between the receiving antennas 131 may be implemented to be less than or equal to the half wavelength of the transmitting and receiving wavelength. When the distance between the receiving antennas 131 is implemented to be less than or equal to the half wavelength of the transmitting and receiving wavelength, since a grating lobe, which is an undesirable radiation lobe may be removed, performance can be improved.

Preferably, the control circuit 110 may be implemented to sequentially transmit radar signals through the i transmitting antennas 121 of the transmitting antenna part 120 and to collectively receive radar signals through all of the j receiving antennas 131 of the receiving antenna part 130 whenever each of the i transmitting antennas 121 transmits the radar signals.

Meanwhile, the control circuit 110 generates a virtual array pattern or received beam distribution by analyzing frequency signals output through the transmitting antennas 121 of the transmitting antenna part 120 and frequency shift of frequency signals received through the receiving antennas 131 of the receiving antenna part 130 and recognizes an object in the vehicle.

Figure 2:
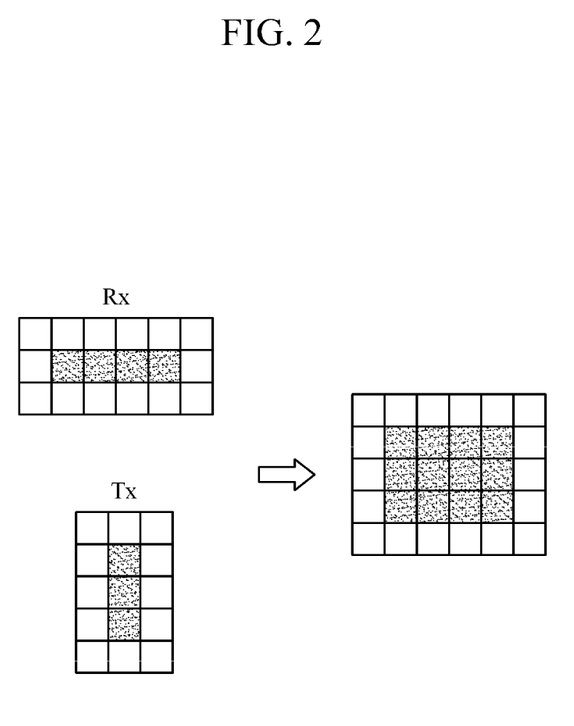
FIG. 2 is a view illustrating an example of a received beam distribution generated by an in-cabin radar apparatus according to one embodiment.

FIG. 2 is a view illustrating an example of a received beam distribution generated by the in-cabin radar apparatus according to one embodiment. A received beam distribution having a rectangular shape corresponding to a spatial shape in the vehicle is generated by the i transmitting antennas 121 disposed in the line in the vertical direction and the j receiving antennas 131 disposed in the line in the horizontal direction as illustrated in FIG. 2. A size of the received beam distribution having the rectangular shape may be determined to correspond to a spatial size in the vehicle by adjusting the numbers of the transmitting antennas 121 and the receiving antennas 131. For example, a large vehicle may be designed so that the numbers of the transmitting antennas 121 and the receiving antennas 131 are relatively greater than those of a small vehicle. Since the virtual array pattern, that is, the received beam distribution, corresponding to the space in the vehicle may be generated by implementing the in-cabin radar apparatus as described above, the detection performance of the in-cabin radar apparatus can be improved.

Meanwhile, according to an additional aspect of the invention, an in-cabin radar apparatus 100 according to the present invention, which forms an adaptively received beam distribution in a space in a vehicle, may further include i transmission side feed lines 140 and j receiving side feed lines 150. Each of the i transmission side feed lines 140 electrically connect a control circuit 110 to one of the i transmitting antennas 121. For example, the transmission side feed lines 140 may be formed in a coplanar waveguide form having an attenuation characteristic for a specific frequency band to reduce unnecessary radiation. In this case, the transmission side feed line 140 may be implemented to be connected to the transmitting antenna 121 in a vertical direction so that an electric field direction matches a feeding direction.

Figure 3:
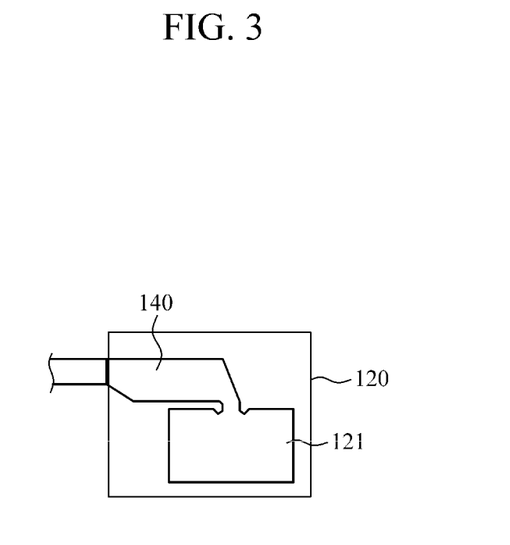
FIG. 3 is a view illustrating an example in which a transmission side feed line of an in-cabin radar apparatus according to one embodiment is connected to a transmitting antenna in a perpendicular direction.

FIG. 3 is a view illustrating an example in which the transmission side feed line of the in-cabin radar apparatus according to one embodiment is connected to the transmitting antenna in a perpendicular direction. Referring to FIG. 3, it can be seen that a distal end of the transmission side feed line 140 electrically connected to the transmitting antenna 121 is electrically connected to the transmitting antenna 121 in the vertical direction from top to bottom on the transmitting antenna 121.

The j receiving side feed lines 150 electrically connect the control circuit 110 to j receiving antennas 131. For example, the receiving side feed lines 150 may be implemented in a coplanar waveguide form having an attenuation characteristic for a specific frequency band in order to reduce unnecessary radiation. In this case, the receiving side feed line 150 may be implemented to be connected to the receiving antenna 131 in the vertical direction so that an electric field direction matches a feeding direction.

Figure 4:
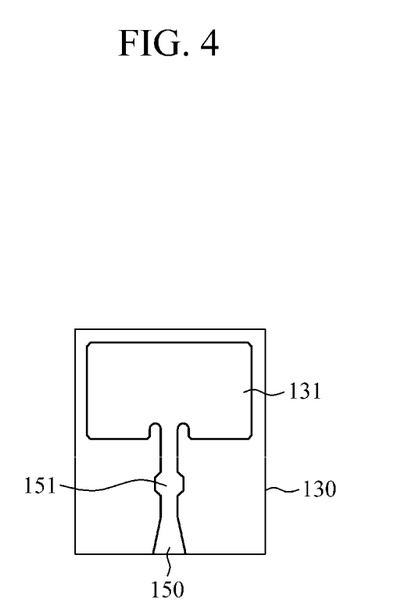
FIG. 4 is a view illustrating an example in which a receiving side feed line of the in-cabin radar apparatus according to one embodiment is connected to a receiving antenna in a perpendicular direction.

FIG. 4 is a view illustrating an example in which the receiving side feed line of the in-cabin radar apparatus according to one embodiment is connected to the receiving antenna in a perpendicular direction. Referring to FIG. 4, it can be seen that a distal end of the receiving side feed line 150 electrically connected to the receiving antenna 131 is electrically connected to the receiving antenna 131 in the vertical direction from bottom to top below the receiving antenna 131. A polarization of the transmitting antenna part 120 and a polarization of the receiving antenna part 130 may be maintained the same by implementing the in-cabin radar apparatus as described above. Since polarizations of reflected waves are generally the same as polarizations of incident waves, reception is performed properly only when the polarization of the transmitting antenna part 120, which is a TX side, and the polarization of the receiving antenna part 130, which is a RX side, are the same.

Meanwhile, according to an additional aspect of the invention, a receiving side feed line 150 of an in-cabin radar apparatus according to the present invention, which forms an adaptively received beam distribution in a space in a vehicle, may further include an impedance matching pattern 151 for impedance matching. Referring to FIG. 4, it can be seen that the impedance matching pattern 151 having an area greater than an area of a receiving side feed line 150 is formed around a portion of the receiving side feed line 150 that is electrically connected to the receiving antenna 131

Meanwhile, according to an additional aspect of the invention, an in-cabin radar apparatus 100 according to one embodiment may further include a large area electromagnetic band gap (EBG) pattern 160. The large area EBG pattern 160 is disposed between a transmitting antenna part 120 and a receiving antenna part 130 and has a high impedance characteristic in a transmitting and receiving frequency band. The large area EBG pattern 160 reduces a size of direct coupling between transmitting antennas 121 and receiving antennas 131.

In addition, the in-cabin radar apparatus 100 according to one embodiment may further include a small area EBG pattern 170. The small area EBG pattern 170 is disposed at a side opposite to a receiving antenna part 130 in which the large area EBG pattern 160 is installed and has a high impedance characteristic in the transmitting and receiving frequency band. The small area EBG pattern 170 significantly reduces the size of the direct coupling between the transmitting antennas 121 and the receiving antennas 131. Due to a control circuit 110, the direct coupling between the receiving antenna part 130 and the transmitting antenna part 120 is weak on a left side in the drawing, and an arrangement area of the EBG pattern may be smaller.

Since the EBG pattern has a high impedance characteristic in a specific frequency band, the EBG pattern has a wideband rejection characteristic for a current flowing on a surface, and thus the EBG pattern may be used as a common ground surface of the in-cabin radar apparatus. Accordingly, while the large area EBG pattern 160 serves as a ground surface of the transmitting antennas 121 of the transmitting antenna part 120, the large area EBG pattern 160 may allow the size of the direct coupling between the transmitting antennas 121 and the receiving antennas 131 to be significantly reduced. In addition, while the small area EBG pattern 170 serves as a ground surface of the receiving antennas 131 of the receiving antenna part 130, the small area EBG pattern 170 may allow the size of the direct coupling between the transmitting antennas 121 and the receiving antennas 131 to be significantly reduced. Since the received beam distribution may be formed to correspond to the space in the vehicle, and the size of the direct coupling may be reduced according to the present invention by implementing the in-cabin radar apparatus as described above, the detection performance of the in-cabin radar apparatus can be improved.

Figure 5:
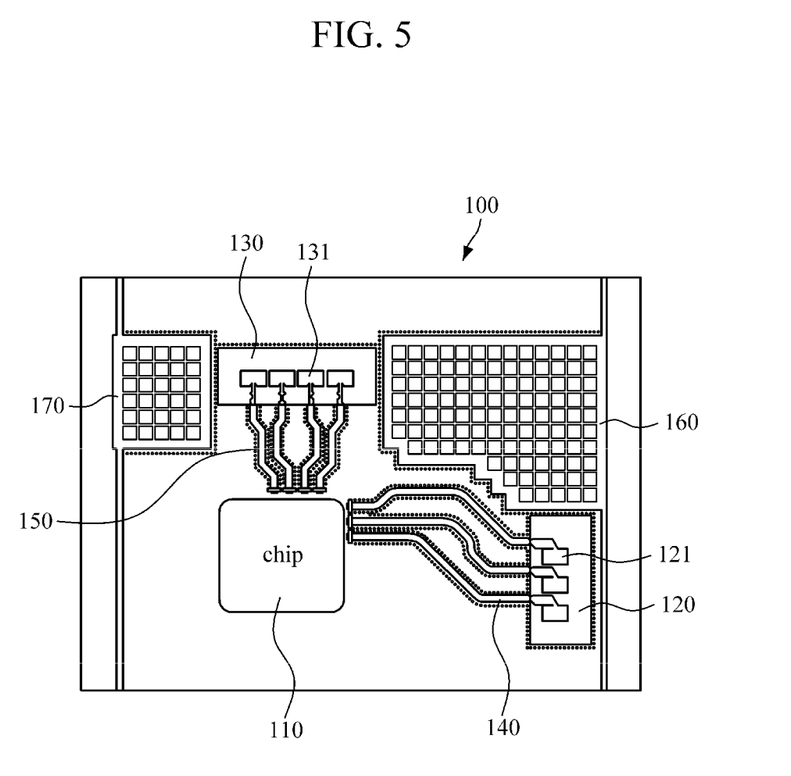
FIG. 5 is a view illustrating a configuration of an in-cabin radar apparatus according to another embodiment.

FIG. 5 is a view illustrating a configuration of an in-cabin radar apparatus according to another embodiment. The embodiment illustrated in FIG. 5 differs from the embodiment illustrated in FIG. 1 only in that an antenna patch is formed in a different shape.

In the embodiment illustrated in FIG. 5, a circular polarization (CP) single patch is used as a transmitting antenna 121 and a receiving antenna 131, unlike FIG. 1 in which a linear polarization (LP) single patch is used as the transmitting antenna 121 and the receiving antenna 131.

Second Embodiment

Figure 6:
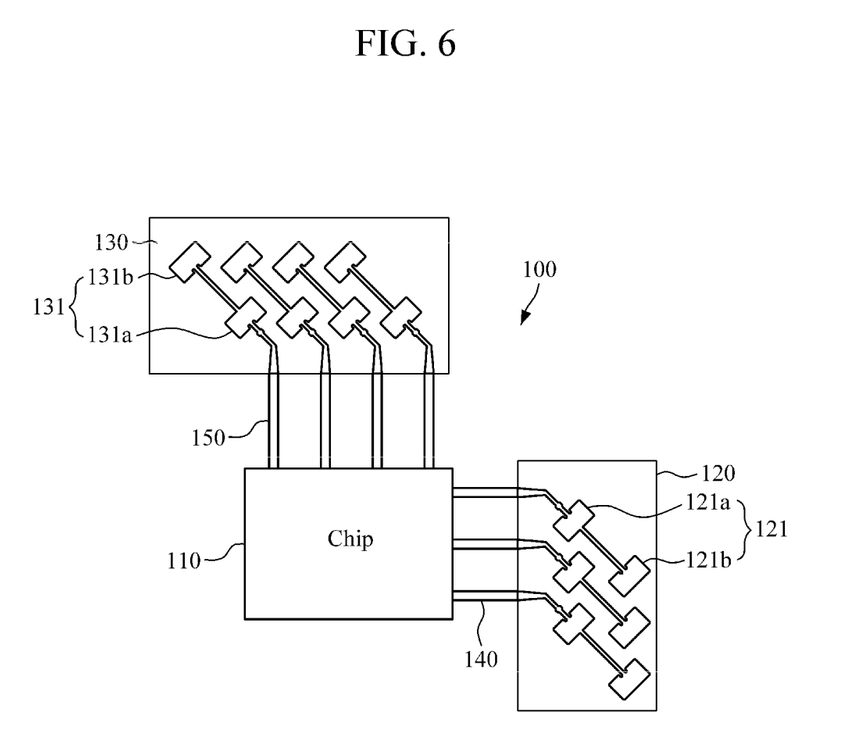
FIG. 6 is a view illustrating a configuration of an in-cabin radar apparatus according to one embodiment.

FIG. 6 is a view illustrating a configuration of an in-cabin radar apparatus according to one embodiment. As illustrated in the drawing, an in-cabin radar apparatus 100 according to one embodiment, which forms a received beam distribution in which a detection area is emphasized, includes a control circuit 110, a transmitting antenna part 120, and a receiving antenna part 130. The control circuit 110 generates a received beam distribution in which only a detection area in which a measurement object (target) is present is emphasized by transmitting radar signals through i transmission channels and processing radar signals reflected by the object in a vehicle and received through j receiving channels and recognizes the object in the vehicle from the received beam distribution in which only the generated detection area is emphasized.

The transmitting antenna part 120 is installed at one side in a direction parallel to the control circuit 110, i transmitting antennas 121 are obliquely disposed in a vertical direction, and each of the transmitting antennas 121 includes a pair of transmitting antenna patches 121*a* and 121*b* between which a distance is greater than or equal to 0.6 times and less than 1 times a transmitting and receiving wavelength.

The receiving antenna part 130 is installed at one side in a direction perpendicular to the control circuit 110, j receiving antennas 131 are obliquely disposed in the horizontal direction, and each of the receiving antennas 131 includes a pair of receiving antenna patches 131*a* and 131*b* between which a distance is greater than or equal to 0.6 times and less than 1 times the transmitting and receiving wavelength. For example, the i transmitting antennas 121 may be obliquely formed in a direction opposite to the j receiving antennas 131 so that an angle of 180 degrees is formed therebetween.

In this case, a direction in which each transmission side feed line 140 is connected to one of the transmitting antennas 121 may be opposite to a direction in which each receiving side feed line 150 is connected to one of the receiving antennas 131. That is, as illustrated in FIG. 6, each of the transmission side feed lines 140 is connected to one of the transmitting antennas 121 in a direction from a left upper side to a right lower side, and each of the receiving side feed lines 150 is connected to one of the receiving antennas 131 in a direction from a right lower side to a left upper side. When the i transmitting antennas 121 and the j receiving antennas 131 are obliquely formed, an antenna installation area can be reduced.

In addition, due to the pair of transmitting antenna patches 121*a* and 121*b* which are included in each of the transmitting antennas 121 and between which the distance is greater than or equal to 0.6 times and less than 1 times the transmitting and receiving wavelength and the pair of receiving antenna patches 131*a* and 131*b* which are included in the receiving antennas 131 and between which the distance is greater than or equal to 0.6 times and less than 1 times the transmitting and receiving wavelength, a narrow received beam distribution is formed in a central region, and a wide received beam distribution is formed in each of a front region and a rear region.

In this case, the central region in which the narrow received beam distribution is formed is a portion between a front seat and a rear seat of a vehicle in a space in the vehicle, that is, a region in which a measurement object (target) is not present, and the front region and the rear region in which the received beam distributions are formed are a front seat portion and a rear seat portion of the vehicle in which a measurement object (target) is present.

Preferably, the control circuit 110 may be implemented to sequentially transmit radar signals through the transmitting antennas 121 of the transmitting antenna part 120 and to collectively receive radar signals through the receiving antennas 131 of the receiving antenna part 130 whenever the radar signals are transmitted through the transmitting antennas.

Meanwhile, the control circuit 110 generates a virtual array pattern, that is, a received beam distribution, by analyzing frequency signals output through the transmitting antennas 121 of the transmitting antenna part 120 and frequency shift of frequency signals received through the receiving antennas 131 of the receiving antenna part 130 and recognizes an object in the vehicle.

Figure 7:
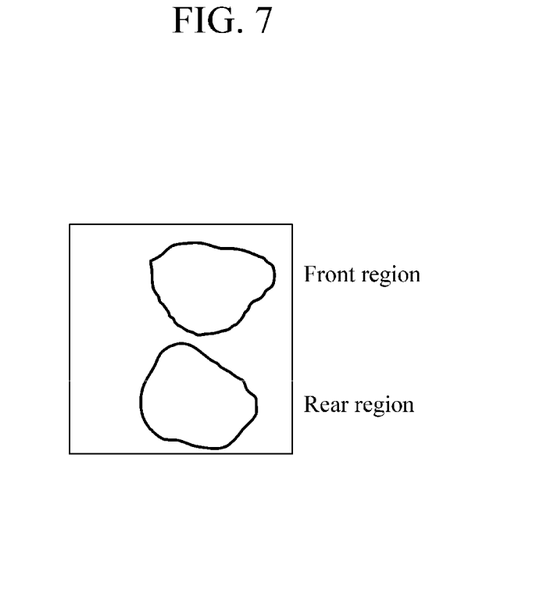
FIG. 7 is a view illustrating an example of a received beam distribution generated by an in-cabin radar apparatus according to one embodiment.

In this case, as illustrated in FIG. 7, the received beam distribution in which only a detection region in which a measurement object is present is emphasized is formed by the pair of transmitting antenna patches 121*a* and 121*b*, which are included in each of the transmitting antennas 121 and between which the distance is greater than or equal to 0.6 times and less than 1 times the transmitting and receiving wavelength, and the pair of receiving antenna patches 131*a* and 131*b*, which are included in each of the receiving antennas 131 and between which the distance is greater than or equal to 0.6 times and less than 1 times the transmitting and receiving wavelength.

FIG. 7 is a view illustrating an example of the received beam distribution generated by the in-cabin radar apparatus according to one embodiment. Referring to FIG. 7, it can be seen that the received beam distribution is formed in which only a front seat portion and a rear seat portion of the vehicle, excluding a back portion between a front seat and a rear seat, that is, a region in which the measurement object (target) is not present, are emphasized. In the present invention, since the received beam distribution is formed to exclude the region in which the measurement object (target) is not present, and only the region including the detection region in which the measurement object is present is emphasized by implementing the in-cabin radar apparatus as described above, the performance of the in-cabin radar apparatus can be improved.

Meanwhile, according to an additional aspect of the invention, an in-cabin radar apparatus 100 according to the present invention, which forms a received beam distribution in which a detection region is emphasized, may further include i transmission side feed lines 140 and j receiving side feed lines 150. Each of the i transmission side feed lines 140 electrically connect the control circuit 110 to one of the i transmitting antennas 121. For example, the transmission side feed lines 140 may be formed in a coplanar waveguide form having an attenuation characteristic for a specific frequency band to reduce unnecessary radiation. Each of the j receiving side feed lines 150 electrically connect the control circuit 110 to one of the j receiving antennas 131. For example, the receiving side feed lines 150 may be implemented in a coplanar waveguide form having an attenuation characteristic for a specific frequency band in order to reduce unnecessary radiation.

By implementing the in-cabin radar apparatus as described above, the control circuit 110 and each of the i transmitting antennas 121 are electrically connected through one of the i transmission side feed lines 140, and the control circuit 110 and each of the j receiving antennas 131 are electrically connected through one of the j receiving side feed lines 150.

Figure 8:
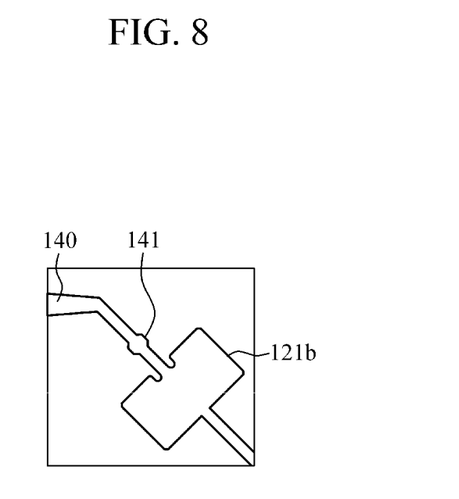
FIG. 8 is a view illustrating an example of an impedance matching pattern formed in a transmission side feed line of an in-cabin radar apparatus according to one embodiment.

Meanwhile, according to an additional aspect of the invention, a transmission side feed line 140 or/and a receiving side feed line 150 may include an impedance matching pattern 141 or/and 151 for impedance matching. FIG. 8 is a view illustrating an example of the impedance matching pattern formed in the transmission side feed line of an in-cabin radar apparatus according to one embodiment. Referring to FIG. 8, it can be seen that the impedance matching pattern 141 having an area greater than an area of the transmission side feed line 140 is formed on the transmission side feed line 140 around a portion electrically connected to a transmitting antenna 121.

Figure 9:
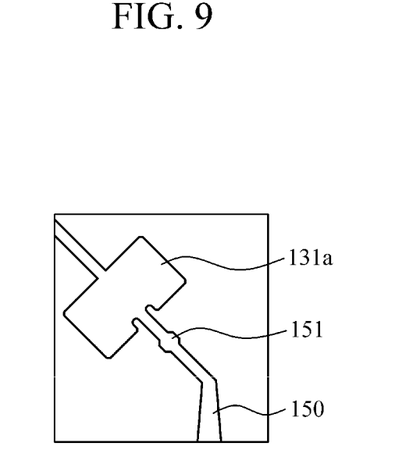
FIG. 9 is a view illustrating an example of an impedance matching pattern formed in a receiving side feed line of an in-cabin radar apparatus according to one embodiment.

FIG. 9 is a view illustrating an example of the impedance matching pattern formed in the receiving side feed line of the in-cabin radar apparatus according to one embodiment. Referring to FIG. 9, it can be seen that the impedance matching pattern 151 having an area greater than an area of the receiving side feed line 150 is formed on the receiving side feed line 150 around a portion electrically connected to the receiving antenna 131.

Figure 10:
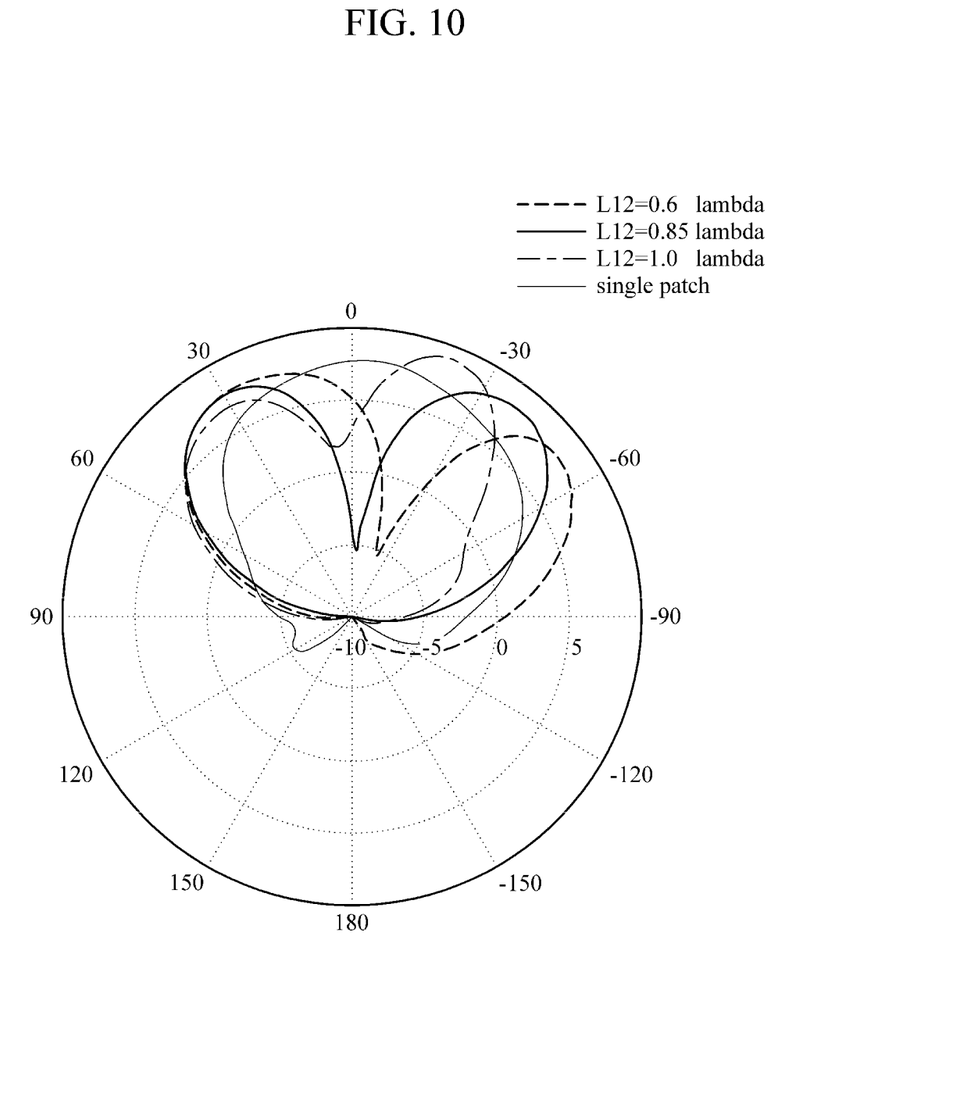
FIG. 10 is a view illustrating an example of radiation patterns of a pair of transmitting antenna patches and a pair of receiving antenna patches of an in-cabin radar apparatus according to one embodiment.

FIG. 10 is a view illustrating an example of radiation patterns of a pair of transmitting antenna patches and a pair of receiving antenna patches of an in-cabin radar apparatus according to one embodiment. Referring to FIG. 10, radiation patterns in which each of a distance between the pair of transmitting antenna patches and a distance between the pair of receiving antenna patches is implemented to be greater than or equal to 0.6 times and less than 1 times a transmitting and receiving wavelength are illustrated. Accordingly, a received beam distribution may be generated in which detection regions are generated to be divided into two regions and the detection region in which a measurement object is present is emphasized.

As described above, in the present invention, since a region in which a measurement object (target) is not present in a space in a vehicle is excluded, and only a received beam distribution emphasizing a detection region in which a measurement object is present is formed, the detection performance of the in-cabin radar apparatus can be improved, and thus the above-described objectives of the present invention can be achieved.

The various embodiments disclosed in this specification and drawings are only specific examples to aid in understanding of the invention and are not intended to limit various embodiments of the present invention.

Accordingly, the scope of various embodiments of the present invention should not be limited by the above-described embodiments, and all changes or modifications derived from the technical ideas of various embodiments of the present invention should be construed as being included in the scope of various embodiments of the present invention.

What is claimed is:

1. An in-cabin radar apparatus, which forms an adaptively received beam distribution in a space in a vehicle, comprising:
   a control circuit which recognizes an object in a vehicle by transmitting radar signals through i transmission channels and processing radar signals reflected by the object in the vehicle and received through j receiving channels;
   a transmitting antenna part which is installed at one side in a direction parallel to the control circuit and in which i transmitting antennas are disposed in a line in a vertical direction;
   a receiving antenna part which is installed at one side in a direction perpendicular to the control circuit and in which j receiving antennas are disposed in a line in a horizontal direction;
   i transmission side feed lines, each of which electrically connects the control circuit to one of the i transmitting antennas; and
   j receiving side feed lines, each of which electrically connects the control circuit to one of the j receiving antennas,
   wherein:
   the i transmitting antennas of the transmitting antenna part are disposed in the vertical direction;
   each of the i transmitting antennas includes a pair of transmitting antenna patches between which a distance is greater than or equal to 0.6 times and less than 1 times a transmitting and receiving wavelength and which are disposed obliquely;
   the j receiving antennas of the receiving antenna part are disposed in the horizontal direction; and
   each of the j receiving antennas includes a pair of receiving antenna patches between which a distance is greater than or equal to 0.6 times and less than 1 times the transmitting and receiving wavelength and which are disposed obliquely.

2. The in-cabin radar apparatus of claim 1, wherein:
   each of the transmission side feed lines is perpendicularly connected to one of the transmitting antennas; and
   each of the receiving side feed lines is perpendicularly connected to one of the receiving antennas.

3. The in-cabin radar apparatus of claim 1, wherein:
a distance between the transmitting antennas is smaller than or equal to half of a transmitting and receiving wavelength; and
a distance between the receiving antennas is smaller than or equal to half of the transmitting and receiving wavelength.

4. The in-cabin radar apparatus of claim 1, further comprising an impedance matching pattern formed at a distal end of the receiving side feed line.

5. The in-cabin radar apparatus of claim 1, wherein the transmission side feed lines and the receiving side feed lines are formed in coplanar waveguide forms.

6. The in-cabin radar apparatus of claim 1, further comprising a large area electromagnetic band gap (EBG) pattern installed between the transmitting antenna part and the receiving antenna part and having a high impedance characteristic in a transmitting and receiving frequency band.

7. The in-cabin radar apparatus of claim 6, further comprising a small area EBG pattern installed at a side opposite to a side at which the large area EBG pattern is formed with respect to the receiving antenna part and having a high impedance characteristic in the transmitting and receiving frequency band.

8. The in-cabin radar apparatus of claim 1, further comprising a transmission impedance matching pattern formed at a distal end of the transmission side feed line.

9. The in-cabin radar apparatus of claim 1, further comprising a receiving impedance matching pattern formed at a distal end of the receiving side feed line.

10. The in-cabin radar apparatus of claim 1, wherein the transmission side feed lines and the receiving side feed lines are formed in coplanar waveguide forms.

11. The in-cabin radar apparatus of claim 1, wherein a direction in which each of the transmission side feed lines is connected to one of the transmitting antennas is opposite to a direction in which each of the receiving side feed lines is connected to one of the receiving antennas.

\* \* \* \* \*